Patented Dec. 26, 1939

2,184,935

UNITED STATES PATENT OFFICE 2,184,935

SULPHONATED AROMATIC ETHER ALCOHOLS

Herman A. Bruson, and Clinton W. MacMullen, Philadelphia, Pa., assignors to Röhm & Haas Company, Philadelphia, Pa.

No Drawing. Application January 10, 1939, Serial No. 250,166

13 Claims. (Cl. 260—512)

This invention relates to a process for preparing aromatic ether alcohols of the general formula R—O—X—OH wherein R is a sulphonated aromatic nucleus and X is an alkylene or polyalkylene ether radical having at least 2 carbon atoms in each alkylene group.

This application is a continuation in part of copending application Serial No. 133,826, filed March 30, 1937.

According to this invention, aromatic ether alcohols R'—O—X—OH are treated with a sulphonating agent, whereby the aromatic nucleus becomes sulphonated and the terminal aliphatic hydroxyl group simultaneously is converted to a sulphuric acid ester. The sulphonation may be carried out with concentrated or fuming sulphuric acid, sulphur trioxide, chlorosulphonic acid, or other suitable sulphonating agent. Throughout the process the ether linkages unexpectedly remain intact instead of splitting and thereby disrupting the molecule. The product obtained R—O—X—$OSO_3H$ is subjected to mild acid hydrolysis as, for example, by boiling it in dilute acidic aqueous solution, which operation splits off the sulphuric ester group without affecting the aromatic sulphonic acid group. The reaction can be represented as follows:

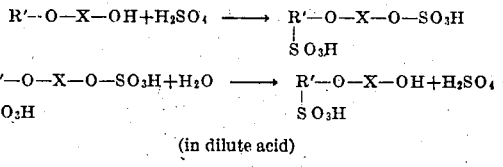

(in dilute acid)

wherein R' is an aromatic nucleus.

The final reaction mixture may be neutralized in the usual manner with inorganic or organic bases to give the corresponding salts of the alcoholic ether sulphonic acid. For this purpose ammonium hydroxide, an organic base such as triethanolamine, or the common alkali hydroxides and carbonates, such as those of sodium or potassium, are quite suitable.

The products obtained are useful as wetting, penetrating, emulsifying, dispersing, cleansing or finishing agents for textiles. On account of the free hydroxyl group which they possess in addition to the ether groups they give, in many cases, certain unique results when applied to textiles. For example, the compounds of the formula A—R(O—$CH_2CH_2$)$_n$OH wherein $n$ is 1 to 4 inclusive, R is a sulphonated phenyl nucleus, and A is an aliphatic hydrocarbon or carboxylic acyl group having up to about twelve carbon atoms, or wherein A is an aralkyl or alicyclic group are accelerators of mercerization. When A is an aliphatic hydrocarbon or acyl group having from 12 to about 26 carbon atoms, the products are powerful softening agents for textiles, such as cotton, rayon and wool, in contrast to the sulphonated sulphates from which they are derived, and which are already described in part in applicants' U. S. Patent No. 2,106,716. The primary aliphatic and, to a less extent, the secondary aliphatic hydrocarbon or acyl groups are especially effective in their softening action.

Typical aromatic ether alcohols which will serve as starting materials include p-ter. butyl phenoxyethoxyethanol, p-ter. octyl phenoxyethanol, o- or p-sec. octyl phenoxyethanol, p-ter. dodecyl phenoxyethanol, o- or p-n-dodecyl phenoxyethanol, o- or p-n-hexadecyl phenoxyethanol, o- or p-n-octadecyl phenoxyethanol, o- or p-n-octadecenyl phenoxyethanol, ter. butyl-β-naphthoxyethanol, ter. octyl-β-naphthoxyethanol, p-ter. octyl phenoxypropanol-1, p-ter. octyl phenoxybutanol-1, p-cyclohexyl phenoxyethanol, p-methyl cyclohexyl phenoxyethanol, p-octyl cyclohexyl phenoxyethanol, p- or o-bornyl phenoxyethanol, p- or o-terpenyl phenoxyethanol, p-, m- or o-naphthenyl phenoxyethanol, o- or p-n-butyryl phenoxyethanol, p- or o-sec. amyl phenoxyethanol, o- or p-sec. octanoyl phenoxyethanol, o- or p-n-dodecanoyl phenoxyethanol, o- or p-n-octadecanoyl phenoxyethanol, p- or o-benzoyl phenoxyethanol, o- or p-naphthenoyl phenoxyethanol, p-ter. octyl phenoxyethoxyethanol, p-ter. octyl phenoxyethoxyethoxy ethanol, p-ter. octyl phenoxyethoxyethoxy ethoxyethanol, o- or p-n-octadecyl phenoxyethoxyethanol.

These starting materials are converted to the sulphate sulphonates which are then heated in aqueous acidic solution until hydrolysis of the sulphuric ester group occurs. Typical resulting compounds are:

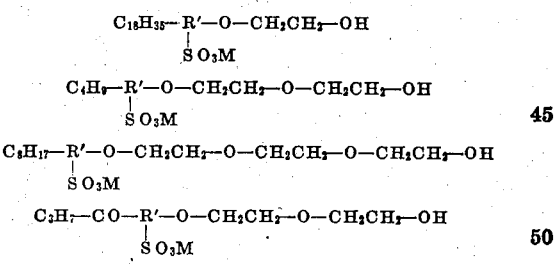

wherein R', as above, represents an aromatic nucleus and M represents hydrogen or a salt-forming cation.

The following examples illustrate the process for preparing sulphonated aromatic ether alcohols.

Example 1 p-α,α,γ,γ-Tetramethylbutyl phenoxyethanol was prepared by the condensation of diisobutylene with phenol and reaction of the resulting alkyl phenol with ethylene chlorohydrin in the presence of caustic soda. B. P. 142–157° C/2 mm.

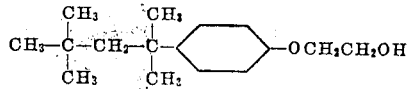

150 g. of 98% sulphuric acid was added with stirring in the course of one hour to 125 g. of p-α,α,γ,γ-tetramethylbutyl phenoxyethanol, allowing the temperature to rise to 60° C. The dark red mixture was then stirred two hours.

500 cc. of water was added, and the mixture warmed two hours on the steam bath with stirring to hydrolyze the sulphuric acid ester group to an hydroxyl group.

The dark brown solution was cooled to room temperature and neutralized by the addition of solid sodium hydroxide. The neutral brown solution was cooled at 0–10° C. overnight and the gelatinous mass filtered by suction, leaving a white crystalline residue of sodium sulphate. The filtrate was chilled again and some additional sodium sulphate removed. p-α,α,γ,γ-tetramethylbutyl phenoxyethanol sodium sulphonate was obtained in aqueous solution in the filtrate.

Example 2

128 g. chlorosulphonic acid was added to 125 g. of p-α,α,γ,γ-tetramethylbutyl phenoxyethanol dropwise, with stirring, in the course of one hour. During the addition the mixture was cooled below 20° C. Hydrogen chloride was given off. The mixture was stirred one hour at 20–30° C. and allowed to stand overnight. 500 cc. of water was added and the mixture heated two hours on the steam bath to hydrolyze the sulphuric acid ester group. The clear, dark brown solution was cooled and neutralized by the addition of solid sodium hydroxide. A portion of the neutral solution was dried in vacuo at 50–73° C./50–10 mm. for six hours. A pink, dry powder was obtained, which was readily soluble in water.

The remainder of the neutral solution was cooled at 0–10° C. overnight, and the gelatinous mass filtered, leaving a white crystalline residue. The clear, amber red filtrate contained p-α,α,γ,γ-tetramethylbutyl phenoxyethanol sodium sulphonate in aqueous solution.

Example 3

Diisobutyl-β-naphthoxyethanol was prepared by the condensation of diisobutylene with β-naphthol, and reaction of the resulting alkyl naphthol with ethylene chlorohydrin in the presence of sodium hydroxide.

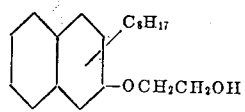

B. P. 212 to 222° C./5 mm.

150 g. of 98% sulphuric acid was added dropwise with stirring to 150 g. of melted diisobutyl naphthoxyethanol, allowing the temperature to rise to 60° C. The viscous, dark mixture was stirred two hours.

500 cc. of water was added and the mixture heated two hours on the steam bath. The solution was cooled and neutralized with solid sodium hydroxide. The neutral red solution was cooled at 0 to 10° C. overnight and filtered from the crystalline residue. The filtrate contained diisobutyl naphthoxyethanol sodium sulphonate in aqueous solution.

Example 4 p-Cyclohexyl phenoxyethanol was prepared by the condensation of p-cyclohexyl phenol with ethylene chlorhydrin in the presence of sodium hydroxide.

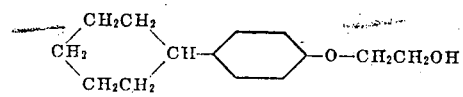

B. P. 146 to 154° C./1 mm.

150 g. of 98% sulphuric acid was added dropwise, with stirring, to 110 g. of melted p-cyclohexyl phenoxyethanol, allowing the temperature to rise to 60° C. The mixture was stirred two hours, 500 cc. of water added, and the mixture heated for two more hours on the steam bath.

The solution was cooled and neutralized with sodium hydroxide solution. The neutral solution was cooled at 0 to 10° C. overnight and filtered from the white, pasty residue. The residue was extracted with ethanol and filtered from insoluble sodium sulphate. After the extract was cooled, sodium p-cyclohexyl phenoxyethanol sulphonate crystallized out as colorless, white needles.

Example 5 p-α,α,γ,γ-Tetramethylbutyl phenoxyethoxy ethanol was prepared by alkaline condensation of p-α,α,γ,γ-tetramethylbutyl phenol with β,β'-dichlorodiethyl ether, conversion of the p-α,α,γ,γ-tetramethylbutyl phenoxyethyl chloride (B. P. 175 to 205° C./3 mm.) to the acetate with potassium acetate, and saponification of the acetate (B. P. 181–210° C./2 mm.) to the alcohol, P. B. 170–192° C./2 mm.

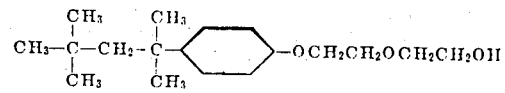

150 g. of 98% sulphuric acid was added dropwise, with stirring, to 147 g. of p-α,α,γ,γ-tetramethylbutyl phenoxyethoxy ethanol, allowing the temperature to rise to 60° C. The red-brown mixture was stirred two hours, 500 cc. of water added, and the mixture heated two hours on the steam bath.

The solution was cooled to room temperature, neutralized with solid sodium hydroxide, cooled overnight at 0 to 10° C., and filtered. p-α,α,γ,γ-tetramethylbutyl phenoxyethoxy ethanol sodium sulphonate was obtained in aqueous solution in the filtrate.

Example 6 p-α,α,γ,γ-Tetramethylbutyl phenoxyethoxy ethoxy ethanol was prepared by the alkaline condensation of p-α,α,γ,γ-tetramethylbutyl phenol with β-chloroethoxy-β'-chlorodiethyl ether, conversion of the resulting p-α,α,γ,γ-tetramethylbutyl phenoxyethoxyethoxy ethyl chloride (B. P. 200 to 220° C./3 mm.) to the acetate (B. P. 190 to 215° C./2 mm.), and saponification of the acetate to the alcohol, B. P. 195 to 217° C./2 mm.

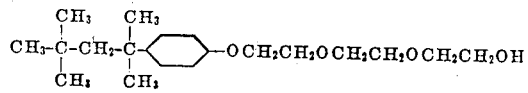

150 g. of 98% sulphuric acid was added dropwise, with stirring, to 169 g. of p-α,α,γ,γ-tetramethylbutyl phenoxyethoxyethoxy ethanol, allowing the temperature to rise to 60° C. The dark brown, viscous mass was stirred two hours, 500 cc. of water added, and the mixture heated on the steam bath two hours.

The solution was cooled, neutralized with solid sodium hydroxide, cooled at 0 to 10° C. overnight, and filtered. p-α,α,γ,γ-tetramethylbutyl phenoxyethoxyethoxy ethanol sodium sulphonate was obtained as an aqueous solution in the filtrate.

Example 7

25 g. of sec. octyl phenoxyethanol was sulphonated by adding 30 g. of 98% sulphuric acid and holding the temperature at about 60° C. for a few hours.

100 g. of water was added and the yellow solution heated on the steam bath for an hour.

The solution was neutralized with solid sodium hydroxide, cooled overnight, and filtered from the crystalline sodium sulphate.

Sec. octyl phenoxyethanol sodium sulphonate,

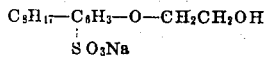

was obtained in the form of a clear, yellow solution.

Example 8

31 g. of lauryl phenoxyethanol (B. P. 200 to 220° C./4 mm.) was sulphonated by adding 30 g. of 98% sulphuric acid dropwise during about 15 minutes, and holding the temperature at about 60° C. for six hours.

100 g. of water was added and the solution heated one hour on the steam bath to hydrolyze the sulphuric ester group to an hydroxyl group.

The turbid solution was neutralized by the addition of caustic soda, and the concentrated solution separated into two layers after cooling. The lower aqueous salt layer was discarded, and the viscous upper soap layer filtered to give a concentrated solution of lauryl phenoxyethanol sodium sulphonate

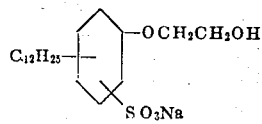

Example 9

73 g. of octadecyl phenoxyethanol was stirred and sulphonated by allowing 60 g. of 98% sulphuric acid to run in dropwise at such a rate that the temperature rose to 60° C. The clear, red oil was stirred and heated at approximately 60° C. for six hours longer.

200 g. of water was added and the pink solution warmed one hour on the steam bath to hydrolyze the sulphuric acid ester group to an hydroxyl group.

The turbid solution was neutralized with 25% of sodium hydroxide solution. 70 cc. of isopropanol was added to the viscous solution. The neutral solution was cooled in the icebox overnight and filtered to remove the insoluble residue of sodium sulphate. Octadecyl phenoxyethanol sodium sulphonate was obtained in the form of a clear, yellow solution

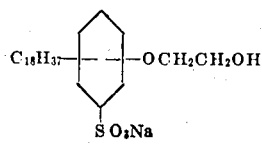

Example 10

80 g. of oleyl-o-methyl phenoxyethanol was sulphonated by adding 60 g. of 98% sulphuric acid dropwise and maintaining the temperature at about 60° C. for seven hours while the mixture was stirred.

200 g. of water was added to the dark brown oil, and the mixture stirred and heated one hour on the steam bath.

70 g. of isopropanol was added and the solution neutralized with solid sodium hydroxide. The neutral solution was cooled overnight and filtered. The filtrate consisted of two layers. The upper layer was a clear, dark brown solution containing oleyl-o-methyl phenoxyethanol sodium sulphonate

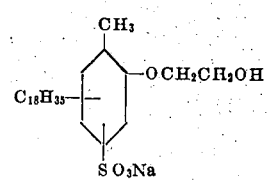

The oleyl-o-methyl phenoxyethanol was prepared by condensing ethylene chlorohydrin with oleyl-o-cresol. Oleyl phenol may likewise be used as the starting material to produce

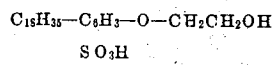

In a similar manner, caproylphenoxyethanol

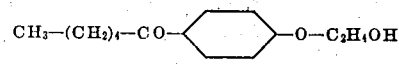

lauroylphenoxyethanol

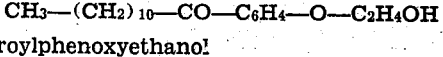

stearoylphenoxyethanol

and homologues thereof can be sulphonated in the aromatic ring and sulphated on the aliphatic hydroxyl group. The sulphuric acid ester is then hydrolyzed in acidic aqueous solution, by boiling as described above, to regenerate the hydroxyl group to yield products of the type

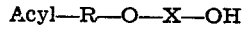

wherein R is a sulphonated aromatic nucleus.

Measurements of properties and practical tests have demonstrated that the introduction of a carbonyl group between a hydrocarbon substituent and the aromatic ring in these compounds does not appreciably change the essential properties of the sulphonated aryl ether alcohols from those shown by compounds carrying and uninterrupted hydrocarbon chain.

It is understood that R or R' can be any aromatic nucleus of the benzene, naphthalene, diphenyl, anthracene, phenanthrene, or higher condenser polynuclear ring system, and that they may contain nuclear inert substituents, for example, halogen, hydrocarbon, acyl, carboxyl, nitro, alkoxy, aryloxy, or other groups.

We claim:

1. A process for preparing a sulphonated aromatic ether alcohol of the general formula R—O—X—OH wherein R is a sulphonated aromatic nucleus and X is a member of the group consisting of alkylene and polyalkylene ether radicals having at least two carbon atoms in each alkylene group, which comprises treating with a sulphonating agent a compound of the formula R'—O—X—OH wherein R' is an aromatic nucleus, to introduce a sulphonic group into the aromatic nucleus and to form a sulphuric ester group, and subsequently heating the product in aqueous, acidic solution to hydrolyze the sulphuric ester group.

2. A process for preparing a sulphonated aromatic ether alcohol of the general formula

R—O—X—OH wherein R is a sulphonated aromatic nucleus and X is a member of the group consisting of alkylene and polyalkylene ether radicals having at least two carbon atoms in each alkylene group, which comprises heating a compound of the formula R—O—X—O—SO₃H in aqueous, acidic solution until hydrolysis of the sulphuric ester group occurs.

3. A process for preparing a sulphonated aromatic ether alcohol of the general formula R—(O—CH₂CH₂)ₙOH wherein R is a sulphonated aromatic nucleus and n is 1 to 4 inclusive, which comprises heating a compound of the formula R—(O—CH₂CH₂)ₙO—SO₃H in aqueous, acidic solution until hydrolysis of the sulphuric ester group occurs.

4. A process for preparing a sulphonated aromatic ether alcohol of the general formula A—R—O—X—OH wherein A represents a member of the group consisting of aliphatic hydrocarbon, alicyclic hydrocarbon, aralkyl, and carboxylic acyl radicals and X is a member of the group consisting of alkylene and polyalkylene ether radicals having at least two carbon atoms in each alkylene group, which comprises heating a compound of the formula A—R—O—X—O—SO₃H in aqueous, acidic solution until hydrolysis of the sulphuric ester group occurs.

5. A process for preparing a sulphonated aromatic ether alcohol of the general formula A—R—O—X—OH wherein A represents a primary aliphatic hydrocarbon group, R represents a sulphonated aromatic nucleus and X is a member of the group consisting of alkylene and polyalkylene ether radicals having at least two carbon atoms in each alkylene group, which comprises heating a compound of the formula A—R—O—X—O—SO₃H in aqueous, acidic solution until hydrolysis of the sulphuric ester group occurs.

6. A process for preparing a sulphonated aromatic ether alcohol of the general formula A—R—O—X—OH wherein A represents a primary aliphatic hydrocarbon group, R represents a sulphonated phenyl nucleus, and X represents a member of the group consisting of alkylene and polyalkylene ether radicals having at least two carbon atoms in each alkylene group, which comprises heating a compound of the formula A—R—O—X—O—SO₃H in aqueous, acidic solution until hydrolysis of the sulphuric ester group occurs.

7. A sulphonated aromatic ether alcohol having the formula A—R—O—X—OH wherein R is a sulphonated aromatic nucleus, A is a substituent selected from the class consisting of primary and secondary aliphatic hydrocarbon groups, alicyclic hydrocarbon groups, aralkyl groups, and carboxylic acyl groups of at least four carbon atoms and X is one of the group consisting of alkylene and polyalkylene ether radicals having at least two carbon atoms in each alkylene group.

8. A sulphonated aromatic ether alcohol having the formula A—R—O—X—OH wherein R is a sulphonated phenyl nucleus, A is a primary aliphatic hydrocarbon radical of at least four carbon atoms, and X is one of the group consisting of alkylene and polyalkylene ether radicals having at least two carbon atoms in each alkylene group.

9. A sulphonated aromatic ether alcohol having the formula A—R—(O—C₂H₄)ₙOH wherein R is a sulphonated aromatic nucleus, A is a member of the group consisting of primary and secondary aliphatic hydrocarbon radicals, alicyclic hydrocarbon radicals, aralkyl radicals and carboxylic acyl radicals of at least four carbon atoms, and n is an integer from 1 to 4 inclusive.

10. A sulphonated aromatic ether alcohol having the formula A—R—(O—C₂H₄)ₙOH wherein R is a sulphonated phenyl nucleus, A is a primary aliphatic hydrocarbon radical of at least four carbon atoms, and n is an integer from 1 to 4 inclusive.

11. A compound having the formula

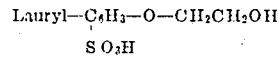

12. A compound having the formula

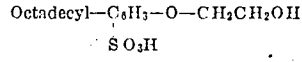

13. A compound having the formula

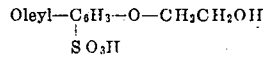

HERMAN A. BRUSON.
CLINTON W. MacMULLEN.